United States Patent
Takahashi et al.

(10) Patent No.: US 12,023,648 B2
(45) Date of Patent: Jul. 2, 2024

(54) PROCESS FOR DESORPTION OF AMMONIA CHEMICAL SPECIES USING CARBON DIOXIDE, AMMONIA CHEMICAL SPECIES-PROVIDING AGENT, AND APPARATUS FOR ADSORPTION AND DESORPTION OF AMMONIA CHEMICAL SPECIES

(71) Applicant: NATIONAL INSTITUTE OF ADVANCED INDUSTRIAL SCIENCE AND TECHNOLOGY, Tokyo (JP)

(72) Inventors: Akira Takahashi, Tsukuba (JP); Tohru Nakamura, Tsukuba (JP); Tohru Kawamoto, Tsukuba (JP); Kimitaka Minami, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 640 days.

(21) Appl. No.: 17/282,903

(22) PCT Filed: Oct. 11, 2019

(86) PCT No.: PCT/JP2019/040264
§ 371 (c)(1),
(2) Date: Apr. 5, 2021

(87) PCT Pub. No.: WO2020/080302
PCT Pub. Date: Apr. 23, 2020

(65) Prior Publication Data
US 2021/0387164 A1 Dec. 16, 2021

(30) Foreign Application Priority Data
Oct. 15, 2018 (JP) .................. 2018-194443

(51) Int. Cl.
 *B01J 20/34* (2006.01)
 *C01C 1/26* (2006.01)
 *C01C 1/28* (2006.01)

(52) U.S. Cl.
 CPC ....... *B01J 20/3433* (2013.01); *B01J 20/3458* (2013.01); *C01C 1/26* (2013.01); *C01C 1/28* (2013.01)

(58) Field of Classification Search
 CPC ..... B01J 20/3433; B01J 20/3458; C01C 1/26; C01C 1/28
 (Continued)

(56) References Cited

U.S. PATENT DOCUMENTS 4,624,841 A 11/1986 Hidaki
5,589,555 A * 12/1996 Zboril .................. C08F 10/02
 502/115

(Continued)

FOREIGN PATENT DOCUMENTS

CN 85101579 A 1/1987
CN 101878181 A 11/2010
(Continued)

OTHER PUBLICATIONS

Thallapally et al., "Prussion Blue Analogues for CO2 and SO2 Capture and Separation Applications", Inorg. Chem. 2010, 49, 4909-4915. (Year: 2010).*

(Continued)

*Primary Examiner* — Anita Nassiri-Motlagh
(74) *Attorney, Agent, or Firm* — HAUPTMAN HAM, LLP

(57) ABSTRACT

An ammonia chemical species desorption process desorbs ammonia chemical species adsorbed onto a Prussian blue derivative more simply at lower cost under milder conditions as compared with using an aqueous solution of a salt (Continued)

or strong acid, and only water. This ammonia chemical species desorption process includes an ammonia chemical desorption step of bringing carbon dioxide and water into contact with a Prussian blue derivative represented by the following general formula (1), thereby desorbing an ammonia chemical species.

$$A_xM[M'(CN)_6]_y \cdot zH_2O \qquad (1)$$

where x is 0 to 3, y is 0.1 to 1.5, z is 0 to 6, A is at least one cation of hydrogen, ammonium, an alkaline metal, and an alkaline earth metal, and M and M' are each independently at least one cation of at least one of atoms having atomic numbers 3 to 83 except for ammonium, an alkali metal, and an alkaline earth metal.

9 Claims, 1 Drawing Sheet

(58) Field of Classification Search
USPC .......................................................... 423/356
See application file for complete search history.

(56) References Cited

U.S. PATENT DOCUMENTS

| | | |
|---|---|---|
| 2002/0146363 A1 | 10/2002 | Benderly et al. |
| 2010/0303703 A1 | 12/2010 | Filippi et al. |
| 2017/0096348 A1 | 4/2017 | Takahashi et al. |

FOREIGN PATENT DOCUMENTS

| | | |
|---|---|---|
| CN | 104117266 A | 10/2014 |
| JP | H06-24737 A | 2/1994 |
| JP | 2000-317246 A | 11/2000 |
| JP | 2008-273833 A | 11/2008 |
| JP | 2016-160170 A | 9/2016 |
| JP | WO2015-186819 A1 | 4/2017 |
| JP | 2017-127835 A | 7/2017 |

OTHER PUBLICATIONS

PCT/ISA/210, "International Search Report for International Application No. PCT/JP2019/040264," Dec. 10, 2019.
J. Helminen et al., J. Chem. Eng. Data 2001, 46, 391-399, "Adsorption Equilibria of Ammonia Gas on Inorganic and Organic Sorbents at 298.15 K".
A. Takahashi et al., JACS, 2016, 138, 6376, "Historical Pigment Exhibiting Ammonia Gas Capture beyond Standard Adsorbents with Adsorption Sites of Two Kinds".
Jiang, Yong et al., "High-capacity and selective ammonium removal from water using sodium cobalt hexacyanoferrate", RSC Advances, 2018, vol. 8, pp. 34573-34581.
Jiang, Yong et al., "High performance sorption and desorption behaviours at high working temperatures of ammonia gas in a cobalt-substituted Prussian blue analogue", Chem. Commun., 2018, vol. 54, pp. 11961-11964.
Farajuli, Durga et al., "Prospective Application of Copper Hexacyanoferrate for Capturing Dissolved Ammonia", Ind. Eng. Chem. Res., 2016, vol. 55, pp. 6708-6715.
China National Intellectual Property Administration, "Office Action and Search Report for Chinese Patent Application 201980066506. 3," Feb. 10, 2023.

* cited by examiner

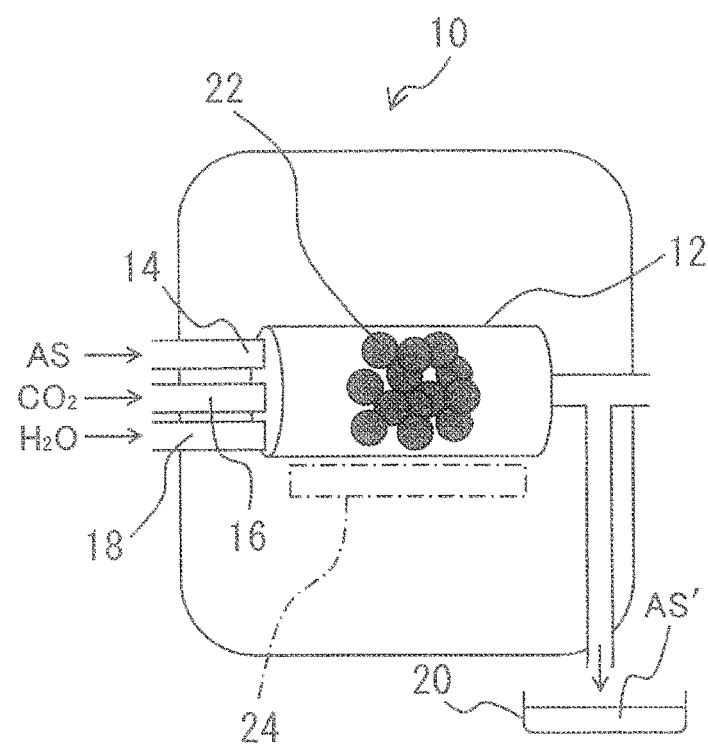

PROCESS FOR DESORPTION OF AMMONIA CHEMICAL SPECIES USING CARBON DIOXIDE, AMMONIA CHEMICAL SPECIES-PROVIDING AGENT, AND APPARATUS FOR ADSORPTION AND DESORPTION OF AMMONIA CHEMICAL SPECIES

RELATED APPLICATIONS

The present application is National Phase of International Application No. PCT/JP2019/040264 filed Oct. 11, 2019, and claims priority from Japanese Application No. 2018-194443, filed Oct. 15, 2018, the disclosure of which is hereby incorporated by reference herein in its entirety.

TECHNICAL FIELD

The invention of this application relates to a process for desorption of ammonia chemical species out of a Prussian blue derivative, onto which ammonia chemical species are adsorbed, using carbon dioxide, an agent capable of providing ammonia chemical species, and an apparatus for adsorption and desorption of ammonia chemical species.

BACKGROUND ART

Gas adsorbents are widely used in the industry. Adsorption of ammonia is an important technique in the industrial, agricultural, and environmental fields. The ammonia adsorbents now available in the art include active charcoal, molecular sieves, zeolite, or materials such as sulfonic acid-containing polymer materials (Patent Publications 1 and 2, and Non-Patent Publication 1). However, these adsorbents are relatively low in terms of ammonia adsorption capacity.

On the other hand, a Prussian blue (hereinafter often called "PB") derivative is very large in terms of ammonia adsorption capacity (Non-Patent Publication 2). However, technologies for desorption of ammonia out of PB derivatives are still less developed. There are only a few processes known for desorption of ammonia out of PB derivatives using an aqueous solution of a salt or strong acid, or ultrapure water (Patent Publication 3, and Non-Patent Publication 2).

PRIOR ARTS

Patent Publications
Patent Publication 1: JP(A) 2016-160170
Patent Publication 2: JP(A) 2000-317246
Patent Publication 3: Japanese Translation of PCT International Application Publication No. 2015-186819
Non-Patent Publications
Non-Patent Publication 1: J. Helminen et al., J. Chem. Eng. Data 2001, 46(2), 391
Non-Patent Publication 2: A. Takahashi et al., J. Am. Chem. Soc., 2016, 138, 6376

SUMMARY OF THE INVENTION

Objects of the Invention

For industrial scale desorption of ammonia from PB derivatives using an aqueous solution of a salt or strong acid, it is necessary to use an apparatus for washing such an aqueous solution and post-washing waste water disposal. A process for desorption of ammonia out of PB derivatives using ultrapure water remains low in terms of ammonia desorption efficiency. An object of the invention of this application is to provide a process capable of desorbing ammonia chemical species such as ammonia or ammonium ions more simply at lower costs under milder conditions as compared to a process of dipping a PB derivative, onto which the ammonia chemical species are adsorbed, in an aqueous solution of a salt or strong acid for desorption. Another object of the invention is to provide an ammonia chemical species adsorbent, an agent of providing ammonia chemical species, and an apparatus for adsorption and desorption of ammonia chemical species used with such a process. Yet another object of the invention is to provide a process for recovery of ammonia chemical species using such an ammonia chemical species-providing agent.

Further objects of the invention are to provide a process for more efficient desorption of an ammonia chemical species as compared with a process for desorption of an ammonia chemical species in which a PB derivative, onto which an ammonia chemical species is adsorbed, is immersed in water alone, an ammonia chemical species adsorbent that may be used with this desorption process, an ammonia chemical species-providing agent, an ammonia chemical species adsorption/desorption apparatus, and a process for recovery of ammonia chemical species using the ammonia chemical species-providing agent.

EMBODIMENTS OF THE INVENTION

As a result of study after study, the inventors have now found that efficient desorption of ammonia chemical species is achievable by bringing a PB derivative having ammonia chemical species adsorbed thereto into contact with carbon dioxide and water, and discovered that previous contact of a PB derivative having ammonia chemical species adsorbed thereto with carbon dioxide results in efficient releasing of the ammonia chemical species in water.

The ammonia chemical species desorption process according the present invention comprises a step of bringing carbon dioxide and water into contact with a Prussian blue derivative having an ammonia chemical species adsorbed thereto and represented by the following general formula (1) for desorption of the ammonia chemical species:

$$A_xM[M'(CN)_6]_y \cdot zH_2O \qquad (1)$$

where x is 0 to 3, y is 0.1 to 1.5, z is 0 to 6, A is at least one cation of hydrogen, ammonium, an alkali metal, and an alkaline earth metal, and M and M' are each independently at least one cation of at least one of atoms having atomic numbers of 3 to 83 except for ammonium, an alkali metal, and an alkaline earth metal.

The ammonia chemical species adsorbent according to the present invention comprises a Prussian blue derivative represented by the above-mentioned general formula (1), and carbon dioxide and water adsorbed onto the Prussian blue derivative. It is here noted that x, y, z, A, M and M' in the general formula (1) are the same as referred to the ammonia chemical species desorption process according to the invention. The ammonia chemical species adsorbent is capable of absorption of an ammonia chemical species. And the ammonia chemical species adsorbent, onto which an ammonia chemical species is adsorbed, is brought in contact with water and/or heated for efficient desorption of the ammonia chemical species.

The ammonia chemical species-providing agent according to the present invention comprises a Prussian blue derivative represented by the afore-mentioned general formula (1), and carbon dioxide, water and ammonia chemical species adsorbed onto the Prussian blue derivative. It is here understood that x, y, z, A, M and M' in the general formula (1) are the same as referred to the ammonia chemical species desorption process according to the invention.

In the ammonia recovery process according to the invention, the ammonia chemical species-providing agent according to the invention is brought into contact with water and/or heated for recovery of at least one of ammonium hydrogencarbonate, ammonium carbonate, and ion ammonium carbonate in a solid or solution state. It is here noted that an ion in the ammonium carbonate is a cation of at least one of an alkali metal and an alkaline earth metal.

The apparatus for adsorption and desorption of ammonia chemical species according of the invention comprises a Prussian blue derivative holder adapted to hold a Prussian blue derivative represented by the aforesaid general formula (1), an ammonia chemical species inlet adapted to introduce an ammonia chemical species into the Prussian blue derivative holder, an carbon dioxide inlet adapted to introduce carbon dioxide into the Prussian blue derivative holder, an water inlet adapted to introduce water into the Prussian blue derivative holder, and an ammonia chemical species collector adapted to collect the ammonia chemical species from said Prussian blue derivative holder. It is here understood that x, y, z, A, M and M' in the general formula (1) are the same as referred to the ammonia chemical species desorption process according to the invention.

Advantages of the Invention

According to the invention of this application, the ammonia chemical species can be desorbed more efficiently at lower cost as compared with a prior art process for desorption of ammonia chemical species wherein a PB derivative, onto which ammonia chemical species are adsorbed, is dipped or immersed in an aqueous solution of a salt or strong acid, or ultrapure water.

BRIEF EXPLANATION OF THE DRAWING

FIG. 1 is a schematic view of the ammonia chemical species adsorption/desorption apparatus according to one embodiment of the invention.

MODES FOR CARRYING OUT THE INVENTION

The invention of this application will now be explained with reference to some embodiments of the invention. The repetition of the same expression may be omitted as needed. It is here understood that the wording "to" standing for a numerical range or scope includes numerical values given before and after it as lower and upper limit values. In one embodiment of the invention, the ammonia chemical species desorption process includes an ammonia chemical species desorption step. In this step, carbon dioxide and water are brought into contact with a Prussian blue derivative having an ammonia chemical species adsorbed thereto for desorption.

The PB derivative is a sort of porous coordination polymers comprising a metal ion (cation having a plus charge), and a cyano group (anionic $CN^-$ having a minus charge) that is a sort of ligands capable of crosslinking this metal ion. The PB derivative includes a series of compounds called a metal cyano complex having a structurally embedded hexacyano metal ion. The PB derivative includes a nanovoid structure that may intake a subject gas therein. The size of this nanovoid structure, i.e., a pore size is 0.3 to 0.6 nm. The PB derivative is made up of a repetition of this nanovoid structure. For this reason, the PB derivative has so large a surface area and so high a selectivity that ammonia chemical species can be efficiently adsorbed and desorbed.

In one embodiment of the invention, the PB derivative is represented by the following general formula (1):

$$A_xM[M'(CN)_6]_y \cdot zH_2O \quad (1)$$

where x is 0 to 3, y is 0.1 to 1.5, z is 0 to 6, A is at least one cation of hydrogen, ammonium, an alkali metal, and an alkaline earth metal, and M and M' are each independently at least one cation of at least one of atoms having atomic numbers of 3 to 83 except for ammonium, an alkali metal, and an alkaline earth metal. It is here noted that M, and M' is not a cation of hydrogen, ammonium, an alkali metal such as lithium, sodium, potassium, rubidium, cesium and francium, and an alkaline earth metal such as magnesium, calcium, strontium, barium and radium, all included in A.

A is a cation of at least one of hydrogen, ammonium, an alkali metal such as lithium, sodium, potassium, rubidium, cesium and francium, and an alkaline earth metal such as magnesium, calcium, strontium, barium and radium. Two or more cations mixed with one another may also be included in A, with x standing for such a value as to keep the charge balance of the whole PB derivative.

M is a cation of at least one metal of vanadium, chromium, manganese, iron, ruthenium, cobalt, rhodium, nickel, palladium, platinum, copper, silver, zinc, indium, lanthanum, europium, gadolinium, and ruthenium. M often stands for at least two cations in admixture; they are present in the PB derivative such that the charge balance of the whole PB derivative is kept. M' includes a cation of at least one metal of vanadium, chromium, molybdenum, tungsten, manganese, iron, ruthenium, cobalt, nickel, platinum, and copper. M' is preferably iron or cobalt in view of the stability of cyanides in the PB derivative.

A combination of M and M' makes it possible to control the adsorption capacity, adsorption rate or selectivity of the ammonia chemical species. When M is $In^{3+}$ and M' is $Fe^{2+}$ or M is $Co^{3+}$ and M' is cobalt $Co^{2+}$, the ammonia chemical species in low to high concentrations can be quantitatively and stably adsorbed onto the PB derivative. In the invention, M and M' may be used in a variety of other combinations. For instance, $Fe^{+3}$ as M may be combined with $Fe^{2+}$ as M'; $Cu^{2+}$ as M may be combined with $Fe^{2+}$ as M'; $Co^{2+}$ as M may be combined with $Co^{3+}$ as M'; or $Cu^{3+}$ as M may be combined with $Co^{2+}$ as M'.

It is well known that voids in the nanovoid structure of PB derivatives comprising A, M, and M' in various combinations are capable of highly selective and efficient adsorption of $Cs^+$ having an ionic radius of 0.183 nm. The reason would be that a nanovoid structure surrounded with minus-charged CNs that are one of the skeletons of PB derivatives, i.e., a void is fit for plus-charged Cs ions in terms of charge and space, resulting in efficient adsorption of $Cs^+$ onto the void.

The plus charge and size of an ammonium ion $NH_4^+$ that is one of ammonia chemical species and has an ionic radius of 0.175 nm are close to those of $Cs^+$. This would be a factor contributing to efficient adsorption of PB derivatives onto ammonia chemical species, and efficient desorption of ammonia chemical species by contact of carbon dioxide with PB derivatives is not limited to any specific metal element, as will be seen from the examples given later. This would result in efficient desorption of ammonia chemical species out of PB derivatives comprising A, M, and M' in various combinations by use of carbon dioxide.

In an embodiment of the invention, the ammonia chemical species include ammonia or at least one of chemical species derived from ammonia. The ammonia chemical species are adsorbed onto at least one site of the inside of a PB derivative, the surface of the PB derivative, and between particles of the PB derivative. For instance, the ammonia chemical species adsorbed to the inside of the PB derivative includes an ammonium cation derived from protonation of ammonia, a coordinated chemical species in which an electron lone pair present on nitrogen of an ammonia molecule is coordinated to the metal M, and a charge-free ammonia chemical species that is within a crystal structure of the PB derivative and adsorbed onto the center of a cube surrounded with cyano groups.

For instance, the ammonia chemical species adsorbed onto the surface of a PB derivative includes an ammonia chemical species coordinated to a metal in the PB derivative, and an ammonia chemical species adsorbed onto the surface of the PB derivative via the van der Waals force. For instance, the ammonia chemical species adsorbed between the particles of the PB derivative includes an ammonia chemical species adsorbed between the particles of the PB derivative via the van der Waals force. In some possible cases, these ammonia chemical species form a bond network with a water molecule by way of hydrogen bonding so that they are adsorbed onto the PB derivative in a cluster form.

These ammonia chemical species are broken down into a chemical species that is relatively strongly adsorbed onto the PB derivative and a chemical species that is relatively weakly adsorbed onto the PB derivative. The ammonia chemical species are adsorbed onto, and desorbed out of, the PB derivative in various forms. In addition, the ammonia chemical species include ammonia-containing inorganic compounds such as ammonium hydrogencarbonate, ammonium potassium carbonate, ammonium sodium carbonate, and ammonium carbonate, alone or in admixture.

The ammonia chemical species are adsorbed onto, and desorbed out of, the PB derivative in a gaseous state or a solution state dissolved in a liquid. To be specific, there are several possible states inclusive of (i) a state where gaseous ammonia is adsorbed onto, and desorbed out of, the PB derivative, (ii) gaseous ammonia is adsorbed onto the PB derivative and ammonia or ammonium cations in a solution form are desorbed out of the PB derivative, (iii) ammonia or ammonium cations in a solution form are adsorbed onto the PB derivative, and gaseous ammonia is desorbed out of the PB derivative, and (iv) ammonia or ammonium cations in a solution form are adsorbed onto, and desorbed out of, the PB derivative.

Among others, adsorption and desorption of gaseous ammonia onto and out of the PB derivative provide the simplest, less costly process from an industrial point of view. The ammonia chemical species such as ammonia gases or ammonium cations in solution adsorbed onto the PB derivative can be desorbed out of the PB derivative in an efficient, simple and low-cost way. In an embodiment of the invention, the PB derivative has a function of acting as an ammonia chemical species-providing agent for efficient desorption or supply of ammonia chemical species in water, and as an ammonia chemical species adsorbent for efficient adsorption of ammonia chemical species.

In an embodiment of the invention, the PB derivative may be used in every form inclusive of a mixture with other inorganic materials such as glass wool, zeolite or molecular sieve, a mixture with polymer compounds or resins, a bond material having a chemical bond, an assembly fixed to a filter or sheet material made up of an organic polymer or a metal or oxide inorganic material, a particulate, columnar or pellet material made up from them. In another embodiment of the invention, the PB derivative may further be filled up in a porous vessel or gas-permeable sheet, or wrapped up with a porous vessel or gas-permeable sheet for use.

Alternatively, the PB derivative may be used in admixture with gels, inks, films, plastics, resins, powders, sand, or liquids such as water, alcohols, oils, organic matters or ionic liquids.

For the purpose of adsorption of ammonia chemical species onto the PB derivative, the PB derivative may be brought in contact with a gas or liquid that contains ammonia chemical species. Thus, there is a PB derivative obtained onto which the ammonia chemical species are adsorbed. Conditions suitable for adsorption of ammonia chemical species onto the PB derivative may be determined by regulation of temperature, pressure, humidity, mixed states of ammonia chemical species, pH, concentration or liquid-solid ratio. The range of temperature, pressure, and humidity well fit for efficient adsorption of ammonia chemical species may vary depending on a specific PB derivative.

The temperature for adsorption of ammonia chemical species onto the PB derivative is relatively low in general, and preferably 150° C. or lower in particular. The pressure for adsorption of ammonia chemical species onto the PB derivative is relatively high in general, and preferably 1 atm. (100 kPa) or higher in particular. The humidity for adsorption of ammonia chemical species onto the PB derivative is preferably 1% RH or higher. On other hand, the mixed state, pH or concentration are preferably adjusted depending on the type of PB derivatives.

In an embodiment of the invention, the PB derivative: $A_x D[M'(CN)_6]_y \cdot zH_2O$ may be used with substation of A, M or M' with other cations. Substitution of A, M, and M' in the PB derivative with other cations that satisfy the specific conditions allows for adjustment of adsorption and desorption rates or capacities of ammonia chemical species. Substitution of A, M or M' in the PB derivative with other cations that satisfy the specific conditions also allows for adjustment of the capability of the PB derivative relating to the absorptive intensity of ammonia chemical species adsorbed or the pressure, temperature or humidity of ammonia chemical species.

Consisting of carbon and oxygen, carbon dioxide is a cluster of molecules having a composition of $CO_2$. In an embodiment of the invention, the carbon dioxide used may be present in a gaseous state, a solution state dissolved in a solvent such as water, and a liquid state at a pressure of 50 atm. or higher. In another embodiment, the carbon dioxide used may be in a gas-solid (dry ice) state where gas and solid coexist, a gas-liquid state where gas and liquid coexist, or a gas-liquid-solid state where gas, liquid and solid coexist. In another embodiment of the invention, the carbon dioxide may be in admixture with other gas, for instance, air exhaled from life.

In the ammonia chemical species desorption process according to an embodiment of the invention, the concentration of gaseous carbon dioxide is selected from a range of 200 ppm to 100% (pure $CO_2$). However, the concentration preferably exceeds the concentration of 400 ppm of carbon dioxide present in the atmosphere. More preferably, the concentration of carbon dioxide is 1% or higher from a point of view of using air exhaled from animals or exhaust gases from composters or burners, even more preferably it is 10% or higher from a point of view of desorption of ammonia chemical species, still even more preferably it is 90% or higher from a point of view of efficient desorption of ammonia chemical species out of the PB derivatives, and most preferably it is 99% or higher from a point of view of using an economical carbon dioxide tank or bomb. Liquid carbon dioxide is mild and friendly to the environment because of having a pH value of about 5 even when saturated in water.

Consisting of hydrogen and oxygen, water is a cluster of molecules having a composition of $H_2O$. In an embodiment of the invention, water may be in a gaseous state such as water vapor, a solution state having a solute dissolved therein, a state containing an insoluble matter, or a liquid state such as pure water, tap water or misty water. In an embodiment of the invention, it is here noted that water may be an admixture of them. Water in a solution state includes an aqueous solution wherein an inorganic or organic material is dissolved, or an aqueous solution wherein an acid or alkali is dissolved. Water in a state containing an insoluble matter includes water that coexists with an insoluble suspended matter, particles, colloids or micell. In yet another embodiment of the invention, water may be rainwater or adsorbed water in crystals.

The step of desorption of ammonia chemical species may include a processing step of bringing carbon dioxide and water into contact with the PB derivative onto which ammonia chemical species are adsorbed. The order, conditions, and manner of contact of carbon dioxide and water with the PB derivative do not matter. It is here understood that water present in the atmosphere contains atmospheric carbon dioxide in a concentration of 500 to 1200 ppm. For this reason, it is preferable that the liquid concentration of carbon dioxide exceeds 1200 ppm in an embodiment of the ammonia chemical species desorption process.

The ammonia chemical species desorption process may include at least one of the following steps (A) to (G).

In step (A), water in which carbon dioxide is dissolved comes in contact with the PB derivative onto which ammonia chemical species are adsorbed.

In step (B), water (carbonated water, soda pop, spring water or the like) wherein a large amount of carbon dioxide is dissolved with a portion of carbon dioxide generated as air bubbles comes in contact with the PB derivative onto which ammonia chemical species are adsorbed.

In steps (A) and (B), it is noted that the PB derivative onto which ammonia chemical species are adsorbed may be immersed or dipped in these waters or, alternatively, they may be allowed to flow down the PB derivative onto which ammonia chemical species are adsorbed.

In step (C), the PB derivative onto which ammonia chemical species are adsorbed is immersed in water in which a gas containing carbon dioxide in a high concentration is then bubbled.

In step (D), the PB derivative onto which ammonia chemical species are absorbed is brought into contact with a gas supplied from a tank or bomb as an example and containing carbon dioxide in a high concentration of at least 99% in the presence of adsorbed water contained in this PB derivative, after which it is immersed in water or processed in a water flow.

In step (E), the PB derivative onto which ammonia chemical species are adsorbed is brought into contact with a carbon dioxide-containing gas provided by an air exhaled from an animal in the presence of adsorbed water contained in this PB derivative, after which it is immersed in water or processed in a water flow.

In step (F), the PB derivative onto which ammonia chemical species are adsorbed is immersed in liquefied carbon dioxide in the presence of adsorbed water contained in this PB derivative, after which it is immersed in water or processed in a water flow.

In step (G), the PB derivative onto which ammonia chemical species are adsorbed is brought into contact with a mixed gas in which gaseous carbon dioxide and water vapor coexist, after which it is immersed in water or processed in a water flow.

In the aforesaid steps (A) to (G), the associated temperatures, pressures, and environmental conditions are properly selected depending on the respective embodiments. In the PB derivative from which ammonia chemical species have been desorbed, there are voids remaining formed, onto which ammonia chemical species can be adsorbed. In other words, the PB derivative according to an embodiment of the invention is capable of repeated adsorption and desorption of ammonia chemical species. The number of this recycle is preferably at least 10, more preferably at least 100 from an economical point of view, and still more preferably at least 500 from an industrial point of view.

The ammonia chemical species adsorbent according to an embodiment of the invention comprises a Prussian blue derivative represented by the aforesaid general formula (1), and carbon dioxide and water adsorbed onto the Prussian blue derivative. It is here understood that x, y, z, A, M, and M' in the general formula (1) are the same as is the case with the ammonia chemical species desorption process according to the aforesaid embodiment of the invention. The ammonia chemical species-providing agent according to an embodiment of the invention comprises a Prussian blue derivative represented by the aforesaid general formula (1), and carbon dioxide, water and ammonia chemical species adsorbed onto the Prussian blue derivative. It is here understood that x, y, z, A, M, and M' in the general formula (1) are the same as is the case with the ammonia chemical species desorption process according to the aforesaid embodiment of the invention.

In the ammonia recovery process according to an embodiment of the invention, the ammonia chemical species-providing agent according to an embodiment of the invention is brought into contact with water and/or heated for recovery of at least one of ammonium hydrogencarbonate, ammonium carbonate, and ion ammonium carbonate as a solution or solid. It is here understood that the ions in ion ammonium carbonate are cations of at least one of an alkali metal and an alkaline earth metal.

FIG. 1 a schematic view of the ammonia chemical species adsorption/desorption apparatus 10 according to an embodiment of the invention, which comprises a Prussian blue derivative holder 12, an ammonia chemical species inlet 14, a carbon dioxide inlet 16, a water inlet 18, and an ammonia chemical species collector 20. The PB derivative holder 12 is adapted to receive and hold a Prussian blue derivative 22 represented by the aforesaid general formula (1). It is here understood that x, y, z, A, M and M' in the general formula (1) are the same as is the case with the ammonia chemical species desorption process according to the aforesaid embodiment of the invention.

The ammonia chemical species inlet 14 is adapted to introduce ammonia chemical species AS into the PB derivative holder 12. When the ammonia chemical species adsorption/desorption apparatus 10 is set up in or around a cowshed or pigpen, ammonia occurring from an excretion fermenter located in or around the cowshed or pigpen may be used as the ammonia chemical species AS.

Alternatively, when the ammonia chemical species adsorption/desorption apparatus 10 is located around a sewage processing plant, ammonia stemming from subcritical processing equipment may be used as the ammonia chemical species AS. Still alternatively, when the ammonia chemical species adsorption/desorption apparatus 10 is located around a plating plant, an ammonium salt contained in waste generated in that plant may be used as ammonia chemical species AS.

The carbon dioxide inlet 16 is adapted to introduce carbon dioxide into the PB derivative holder 12. For efficient desorption of ammonia chemical species out of the PB derivative 22, it is preferable that the concentration of carbon dioxide exceeds 400 ppm that is the concentration of carbon dioxide present in the atmosphere. From an industrial point of view, the carbon dioxide inlet may be connected to a carbon dioxide bomb or cylinder. The water inlet 18 is adapted to introduce water in the form of water vapor or a liquid into the PB derivative holder 12.

It is here appreciated that at least two of the ammonia chemical species inlet 14, carbon dioxide inlet 16 and water inlet 18 may be combined to introduce at least two of the ammonia chemical species, carbon dioxide and water together into the PB derivative holder 12. The ammonia chemical species collector 20 is adapted to collect ammonia chemical species AS' from the PB derivative holder 12. The ammonia chemical species AS introduced into the PB derivative holder 12 may be identical with, or different from, the ammonia chemical species AS' collected out of the PB derivative holder 12. There may be a heater 24 or other heating means provided around the PB derivative holder 12.

EXAMPLES

PB derivatives were each prepared in the following procedure. An aqueous solution of $[Fe(CN)_6]^{4-}$ (herein-after often called the HCF) was used, and an aqueous solution of a chloride or nitrate of the corresponding metal cation (copper (II)) was added to the aqueous solution such that there was a charge balance of 0 obtained. The resulting solution was mixed and shaken by means of a shaker (Shaking incubator Sl-300C, AsOne) or stirred by a stirrer such as a magnetic stirrer) for precipitation of a PB derivative.

For each of the obtained PB derivatives, its crystal structure was determined using an X-ray diffraction device (Phaser D2 made by Bruker Co., Ltd. (the same will apply below)), and its composition was determined using an inductively coupled plasma mass spectrometer (NEXION300D available from PerkinElmer Co., Ltd. (the same will apply below)) or an atomic emission spectral analysis device (4100MP-AES made by Agilent Technology Co., Ltd. (the same will apply below)). Unless otherwise stated, the adsorption and desorption of ammonia chemical species onto and out of the PB derivatives were carried out at normal temperature under normal pressure. The concentrations of ammonia chemical species desorbed out of the PB derivatives were measured using a water quality measuring device (Lambda 9000 available from Kyoritsu-lab Co., Ltd. (the same will apply below)) making use of color-producing reactions or a Fourier transform infrared spectrophotometer (Nicolet iS5 made by ThermoFisher Co., Ltd. (the same will apply below)).

Adsorption and Desorption of Ammonia Chemical Species Using the PB Derivative CuHCF

Example 1

Preparation of CuHCF

At room temperature, an aqueous solution of copper (II) nitrate was added rapidly to an aqueous solution of $K_4$—HCF within a cylindrical plastic tube for centrifugation, and then stirred by a stirrer. The resulting compound was separated from a supernatant by means of a centrifuge (a table-top refrigerable fast centrifuge Sigma 3-3-K (the same will apply below)) followed by removal of the supernatant, and ultrapure water was then added to that compound followed by shaking and washing. This procedure was repeated three times to obtain a precipitate. The resulting CuHCF precipitate was subjected to extrusion molding, and then dried in an oven (Oven OFW-450B (the same will apply below)) to obtain a copper substitution type of CuHCF granules or a sort of PB derivatives.

Analysis of CuHCF

As a result of estimation of the obtained CuHCF by means of the X-ray diffraction device, it has been found that the peak position of this CuHCF matches that of $Fe[Fe(CN)_6]_{0.75}$ in the data base. From this, it has been understood that the obtained CuHCF has the same crystal structure as that of PB. Further, 50 mg of CuHCF powders were added to a mixed liquid of 4 mL of hydrochloric acid and 2 mL of nitric acid to decompose CuCHF powders by means of a microwave decomposition device (Multiwave 3000 available from PerkinElmer Co., Ltd (the same will apply below)).

Thereafter, the respective elements such as K and Fe contained in CuHCF were quantitated by means of the inductively coupled plasma mass spectrometer or the atomic emission spectral analyzer. It is here noted that C and N were quantitated by light element analysis. It has consequently been found that the product of Example 1 is a CuHCF granule in which a copper substitution type of $K_{0.66}Cu[Fe(CN)_6]_{0.66} \cdot 3\text{~}4H_2O$ containing a slight amount of the raw material K is granulated.

Estimation of Desorption of Ammonia Chemical Species Out of CuHCF

About 100 grams of the CuHCF granules were charged in a beaker, and placed in a desiccator that was then lidded. The desiccator was filled up with 400 ppmv of ammonia gas, and let standing for about 69.5 hours for adsorption of ammonia chemical species onto the CuHCF granules. About 0.5 gram of this CuHCF having ammonia chemical species adsorbed thereto was charged in an EZ column having a diameter of 10 mm (equipped with a filter, and made by ISIS Inc.), and provided at a flow rate of about 100 mL/minute with carbon dioxide having a purity of 99.5% or higher from a 10 L high-pressure bomb for 20 hours for circulation through the column (a total of about 120 L).

The CuHCF processed by contact with carbon dioxide was removed from the EZ column, placed in 5 mL of pure water (MilliQ water (the same will apply below)), and shaken at 600 rpm for 3 hours with the use of a shaker for ammonia chemical species desorption. The ammonia chemical species concentration of the obtained aqueous solution was 66.0 mmol/L.

Comparative Example 1

Without recourse to contact with carbon dioxide, Example 1 was repeated for adsorption of ammonia chemical species onto the CuHCF granules, followed by desorption of ammonia chemical species out of the CuHCF granules. As a result, the ammonia chemical species concentration of the obtained aqueous solution was 21.1 mmol/L.

That is, the amount of desorption of ammonia chemical species in Example 1 was at least triple as much as the amount of desorption of ammonia chemical species in Comparative Example 1. From this result it has been found that if CuCHF that is a sort of PB derivatives is brought into contact with carbon dioxide-containing water under mild conditions, the adsorbed ammonia chemical species can then be efficiently released in water.

Example 2

The CuHCF granules of Example 1 were set in a column capable of passage of water in a gaseous or liquid state, placed in an 80° C. column oven, and dried for 4 hours or longer while $N_2$ gas was passed through it at a rate of 1 L/min. Thereafter, the temperature of the column oven was lowered to 25° C., and 0.5 vol % of ammonia gas, 1 vol % of water vapor and $N_2$ gas containing 5 vol % of carbon dioxide were continued to flow through the column oven at about 0.5 mL/min. Ammonia gas flowing out of the column outlet was trapped by boric acid in a concentration of 5 g/L, and ion chromatography was used to carry out an analysis of how CuHCF granules were disrupted in the column.

As a result, the amount of ammonia chemical species adsorbed onto the CuHCF granules was 6.2 mmol/g. Then, pure water was allowed to flow through the column at 2 mL/minute in which ammonia chemical species were adsorbed onto the CuHCF granules for the purpose of washing them. A total of 300 mL of washing water stemming from pure water was collected to analyze the amount of nitrogen in the washing water by means of ion chromatography. As a result, the amount of ammonia chemical species desorbed out of the CuHCF was 2.3 mmol/g.

Comparative Example 2

In the same procedure as in Example 2, the CuHCF granules of Example 1 were set in the column, and dried. Thereafter, the temperature of the column oven was lowered to 25° C., and $N_2$ gas containing 0.5 vol % of ammonia gas was continued to flow through the column at about 0.5 mL/minute. How the CuHCF granules were disrupted in the column was analyzed as in Example 2. As a result, the amount of ammonia chemical species adsorbed onto the CuHCF granules was 6.2 mmol/g. Then, the amount of ammonia chemical species desorbed out of the CuHCF granules was measured as in Example 2. The amount of ammonia chemical species desorbed out of the CuHCF granules was 0.13 mmol/g.

Comparative Example 3

In the same procedure as in Example 2, the CuHCF granules of Example 1 were set in the column, and dried. Thereafter, the temperature of the column oven was lowered to 25° C., and $N_2$ gas containing 0.5 vol % of ammonia gas and 1 vol % of water vapor was continued to flow through the column at about 0.5 mL/minute. How the CuHCF granules were disrupted in the column was analyzed as in Example 2. As a result, the amount of ammonia chemical species adsorbed onto the CuHCF granules in the column was 6.2 mmol/g. Then, the amount of ammonia chemical species desorbed out of the CuHCF granules was measured as in Example 2. The amount of ammonia chemical species desorbed out of the CuHCF granules was 0.46 mmol/g.

From the results of Example 2 and Comparative Examples 2 and 3, it has been found that as ammonia chemical species are adsorbed onto CuHCF that is a sort of PB derivatives under mild conditions under the presence of both carbon dioxide and water vapor, it permits the adsorbed ammonia chemical species to be efficiently released into water.

Example 3

Without recourse to the step of drying the column having CuHCF granules set therein at 80° C., Example 2 was repeated to adsorb ammonia chemical species onto the CuHCF granules. Thereafter, the washing water stemming from pure water collected in the same procedure as in Example 2 was analyzed using a total organic carbon meter (multi N/C 3100 (the same will apply hereinafter)). As a result, the material quantitative ratio (i.e., molar ratio) of nitrogen and carbon in the ammonia chemical species desorbed out of the CuHCF granules was about 1:1. That is, this ammonia chemical species is a compound containing nitrogen and carbon in the same material quantitative ratio; given general chemical reactions, it is regarded as ammonium hydrogencarbonate ($NH_4HCO_3$). This means that according to the ammonia chemical species desorption process of the invention, there is a solution of ammonium hydrogencarbonate obtained.

Example 4

In the same procedure as in Example 3, ammonia chemical species were adsorbed onto the CuHCF granules. The CuHCF granules were put in a lower portion of a glass test tube, and glass wool was placed on the CuHCF granules. Further, a rubber balloon was attached to an opening portion of the glass test tube in such a way as to prevent a gaseous material generated in the glass test tube from going out of the glass test tube. The lower portion of the glass test tube was dipped in an oil bath and heated to about 100° C. As a result, a white solid was precipitated on an upper inside wall of the glass test tube. This white solid was analyzed by means of a Fourier transform infrared spectrophotometer. As a result, the spectral peak pattern of the white solid obtained in Example 4 matched that of ammonium hydrogen-carbonate ($NH_4HCO_3$).

Example 5

Example 4 was repeated with the exception of heating the lower portion of the glass test tube using a mantle heater in place of the oil bath, resulting in precipitation of a white solid on an upper inside wall of the glass test tube as in Example 4. In the same procedure as in Example 4, this white solid was analyzed by means of a Fourier infrared spectrophotometer. As a result, the spectral peak pattern of the white solid in obtained Example 5 matched that of ammonium hydrogen-carbonate ($NH_4HCO_3$).

From the results of Examples 3 to 5, it has been found that as ammonia chemical species adsorbed onto CuHCF that is a sort of PB derivatives are released off, it allows ammonium hydrogencarbonate to be easily obtained in a solution or solid form and ammonia chemical species to be recovered in the form of a carbonate, meaning that carbon dioxide, water, and the PB derivative onto which ammonia chemical species are adsorbed according to an embodiment of the invention function as an ammonia chemical species-providing agent.

Adsorption and Desorption of Ammonia Chemical Species Using PB Derivative InHCF

Example 6

Preparation of InHCF

In a cylindrical plastic tube for centrifugation, 20 mL of an aqueous solution of 0.334 mol/L indium (III) chloride were mixed at room temperature with 20 mL of 0.250 mol/L potassium ferrocyanide rapidly. The obtained compound was separated from a supernatant by means of a centrifuge, and washed 6 times with pure water to obtain InHCF. Pure water was added to InHCF, stored in a mixed liquid state having an average concentration of about 3 mg/L, and then used for experimentation.

Analysis of InHCF This mixed liquid was fractionated by filtration, and further dried into InHCF powders that were then analyzed by an X-ray diffraction device. As a result, it has been found that this InHCF powder is a crystal having main peaks in the vicinity of 17.5°, 25°, and 36°. These matched the peak position of Prussian blue $Fe[Fe(CN)_6]_{0.75}$ in the data base. That is, it has been found that the obtained InHCF has the same crystal structure as the PB crystal structure.

Further, about 50 mg of InHCF powders were added to a mixed liquid comprising 4 mL of hydrochloric acid and 2 mL of nitric acid, and decomposed by a microwave decomposition device. Thereafter, the elements contained in the compound were respectively quantitated by means of the inductively coupled plasma mass spectrometer or the atomic emission spectral analysis device. It is here noted that C and N were quantitated by means of a light element analytical method. As a result, the product of Example 6 was $K_{0.039}In[Fe(CN)_6]_{0.75} \cdot Cl_{0.032} \cdot 3.8H_2O$ containing a slight amount of the starting materials K and Cl.

Estimation of Desorption of Ammonia Chemical Species Out of InHCF

After mixing of a dispersion of InHCF in water with a 0.6% aqueous solution of polyvinyl alcohol, the mixed liquid was added dropwise to a silicon wafer substrate, and dried in an oven at 60° C. for 60 minutes to prepare a silicon wafer substrate having an InHCF film formed on its surface. A small glass bottle containing concentrated ammonia water in a concentration of 28% was set in a sample tube, and the silicon wafer substrate was put in this sample tube that was then lidded and let standing for about 20 minutes. As a result of analysis of the InHCF film after standing by means of the Fourier transform infrared spectrophotometer, the peak of the adsorbed ammonia chemical species was observed in the vicinity of 1420 $cm^{-1}$.

After the InHCF film having ammonia chemical species adsorbed onto it was dipped in 15 mL of water containing saturated carbon dioxide for 30 seconds, it was again analyzed by the Fourier transform infrared spectro-photometer to estimate the amount of desorption of ammonia chemical species based on changes in the adsorption peak of ammonia chemical species. It has been found that there is an about 76% reduction in the adsorption peak of ammonia chemical species observed in the vicinity of 1420 $cm^{-1}$. It is here noted that because there is a variation in the thickness of the InHCF film, the ratio of each peak relative to the peak of a cyano group that is the basic skeleton of InHCF observed at 2050 to 2100 $cm^{-1}$ was normalized for comparison of its increase and decrease.

Comparative Example 4

In the same procedure as in Example 6, there was a silicon wafer substrate prepared in which an InHCF film having ammonia species adsorbed onto it was formed on the surface. As a result of immersion of this InHCF film in 15 mL of pure water, there was an about 52% reduction in the adsorption peak of ammonia chemical species observed in the vicinity of 1420 $cm^{-1}$. The amount of desorption of ammonia chemical species in Example 6 was approximately 20% more than that in Comparative Example 4. From this result, it has been understood that as InHCF that is a sort of PB derivatives is brought into contact with water containing carbon dioxide under mild conditions, it allows the adsorbed ammonia chemical species to be efficiently released into water.

Adsorption and Desorption of Ammonia Chemical Species Using PB Derivative ZnHCF

In a cylindrical plastic tube for centrifugation, 10 mL of an aqueous solution of 25 mM $K_4$—HCF were mixed at room temperature with 10 mL of an aqueous solution of 50 mM $ZnCl_2$ rapidly. Thereafter, the mixture was shaken at room temperature in a shaker for 24 hours. The compound and supernatant obtained through the centrifuge were separated from each other followed by removal of the supernatant, and the compound was then shaken and washed with addition of ultrapure water. This was repeated three times. After removal of the last supernatant, the obtained precipitate was dried at 100 kPa and room temperature for 3 days using an oven.

Analysis of ZnHCF

The obtained ZnHCF was analyzed by an X-ray diffraction device. As a result, it has been found that this ZnHCF is a crystal having main peaks in the vicinity of 17.5°, 25°, 36°, etc. These matched the peak position of Prussian blue $Fe[Fe(CN)_6]_{0.75}$ in the data base. That is, it has been found that the obtained ZnHCF has the same crystal structure as the PB crystal structure.

Estimation of Desorption of Ammonia Chemical Species Out of ZnHCF

After mixing of a dispersion of ZnHCF in water with a 0.3% polyvinyl alcohol aqueous solution, the mixed liquid was added dropwise to a silicon wafer substrate, and dried in an oven at 60° C. for 10 minutes to prepare a silicon wafer substrate having a ZnHCF film formed on its surface. A small glass bottle containing concentrated ammonia water in a concentration of 28% was set in a sample tube, and the silicon wafer substrate was put in this sample tube that was then lidded and let standing for about 8 minutes. As a result of analysis of the ZnHCF film after standing by means of the Fourier transform infrared spectrophotometer, the peak of the adsorbed ammonia chemical species was observed in the vicinity of 1260 $cm^{-1}$.

After the ZnHCF film having ammonia chemical species adsorbed onto it was dipped in 15 mL of water containing saturated carbon dioxide for 40 seconds, it was again analyzed by the Fourier transform infrared spectro-photometer to estimate the amount of desorption of ammonia chemical species based on a change in the adsorption peak of ammonia chemical species. It has been found that there is an about 59% reduction in the adsorption peak of ammonia chemical species observed in the vicinity of 1260 $cm^{-1}$. It is here noted that as is case with Example 6, each peak was normalized for comparison of its increase and decrease.

Comparative Example 5

In the same procedure as in Example 7, there was silicon wafer substrate prepared in which a ZnHCF film having ammonia chemical species adsorbed onto it was formed on the surface. As a result of immersion of this ZnHCF film in 15 mL of pure water for 40 seconds, it has been found that the reduction in the adsorption peak of ammonia chemical species observed in the vicinity of 1260 $cm^{-1}$ is only about 17%. The amount of desorption of ammonia chemical species in Example 7 is more than three times as much as that in Comparative Example 5. From this result, it has been found that as ZnHCF that is a sort of PB derivatives is brought into contact with water containing carbon dioxide, it allows the adsorbed ammonia chemical species to be efficiently released in water.

INDUSTRIAL APPLICABILITY

The ammonia chemical species desorption process of the present invention is capable of efficient desorption of ammonia chemical species adsorbed onto PB derivatives; hence, it can be widely used in the field of adsorption and desorption of ammonia chemical species. Ammonia chemical species desorbed out of PB derivatives, i.e., ammonia or a series of ammonium carbonates (such as ammonium hydrogencarbonate, ammonium potassium carbonate, ammonium sodium carbonate, and ammonium carbonate alone or in admixture) are obtained in a solution or solid form of precipitates.

The solid-state precipitates may be used as chemical raw materials in the chemical industry, fertilizers, or neutralizers. If ammonia chemical species desorbed out of PB derivatives are subjected to chemical transformation, they may then be used as an energy source or hydrogen carrier for power generation. Further, ammonia chemical species desorbed out of PB derivatives may be used for synthesis of useful materials stemming from ammonia chemical species used as raw materials, for instance, pharmaceuticals, agricultural chemicals, surface processing agents, amino acids or proteins for foodstuffs, and industrial polymers.

EXPLANATION OF NUMERAL REFERENCES

10: Ammonia chemical species adsorption/desorption apparatus
12: Prussian blue derivative holder
14: Ammonia chemical species inlet
16: Carbon dioxide inlet
18: Water inlet
20: Ammonia chemical species collector
22: Prussian blue derivative
24: Heater
AS, AS': Ammonia chemical species

What is claimed is:

1. A process for desorption of ammonia chemical species, comprising an ammonia chemical desorption step of bringing carbon dioxide and water into contact with a Prussian blue derivative onto which an ammonia chemical species is adsorbed, thereby desorbing the ammonia chemical species, wherein the Prussian blue derivative is represented by the following general formula (1):

$$A_xM[M'(CN)_6]_y \cdot zH_2O \qquad (1)$$

where x is 0 to 3, y is 0.1 to 1.5, z is 0 to 6, A is at least one cation of hydrogen, ammonium, an alkaline metal, and an alkaline earth metal, and M and M' are each independently at least one cation of at least one of atoms having atomic numbers of 3 to 83 except for ammonium, an alkali metal, and an alkaline earth metal.

2. The process for desorption of ammonia chemical species according to claim 1, wherein each of M and M' is at least one cation of atoms belonging to families 3 to 13 of the periodic table.

3. The process for desorption of ammonia chemical species according to claim 1, wherein M is a cation of copper, zinc, or cobalt, and M' is a cation of iron or cobalt.

4. The process for desorption of ammonia chemical species according to claim 1, wherein a concentration of carbon dioxide to be brought into contact with the Prussian blue derivative exceeds 400 ppm (0.04%) in a gaseous state, and 200 ppm (0.12%) in a solution state.

5. The process for desorption of ammonia chemical species according to claim 1, wherein the ammonia chemical species desorption step comprises an additional step of bringing water into contact with the Prussian blue derivative after contact of gaseous carbon dioxide with the Prussian blue derivative.

6. The process for desorption of ammonia chemical species according to claim 1, wherein the ammonia chemical species desorption step comprises an additional step of bringing gaseous carbon dioxide and water vapor into contact with the Prussian blue derivative.

7. An ammonia chemical species-providing agent, comprising a Prussian blue derivative represented by the following general formula (1), and carbon dioxide, water, and an ammonia chemical species adsorbed onto the Prussian blue derivative:

$$A_xM[M'(CN)_6]_y \cdot zH_2O \qquad (1)$$

where x is 0 to 3, y is 0.1 to 1.5, z is 0 to 6, A is at least one cation of hydrogen, ammonium, an alkaline metal, and an alkaline earth metal, and M and M' are each independently at least one cation of at least one of atoms having atomic numbers of 3 to 83 except for ammonium, an alkali metal, and an alkaline earth metal.

8. A process of recovery of ammonia by bringing the ammonia chemical species-providing agent according to claim 7 into contact with water and/or heating the ammonia chemical species-providing agent for recovery of at least one of ammonium hydrogencarbonate, ammonium carbonate, and ion ammonium carbonate in a solid or solution state, wherein an ion in the ion ammonium carbonate is at least one cation of an alkali metal and an alkaline earth metal.

9. An adsorption and desorption apparatus of ammonia chemical species, comprising:
  a Prussian blue derivative holder adapted to receive and hold a Prussian blue derivative represented by the following general formula (1);
  an ammonia chemical species inlet adapted to introduce ammonia chemical species into the Prussian blue holder;
  a carbon dioxide inlet connected to a carbon dioxide cylinder adapted to introduce carbon dioxide into the Prussian blue derivative holder;
  a water inlet adapted to introduce water into the Prussian blue derivative holder; and
  an ammonia chemical species collector adapted to collect the ammonia chemical species from the Prussian blue derivative holder;

$$A_xM[M'(CN)_6]_y \cdot zH_2O \qquad (1)$$

where x is 0 to 3, y is 0.1 to 1.5, z is 0 to 6, A is at least one cation of hydrogen, ammonium, an alkaline metal, and an alkaline earth metal, and M and M' are each independently at least one cation of at least one of atoms having atomic numbers of 3 to 83 except for ammonium, an alkali metal, and an alkaline earth metal.

* * * * *